Aug. 12, 1958   E. COHEN ET AL   2,847,594
ELECTROMAGNETIC SLIP COUPLING
Filed Feb. 21, 1955   2 Sheets-Sheet 1
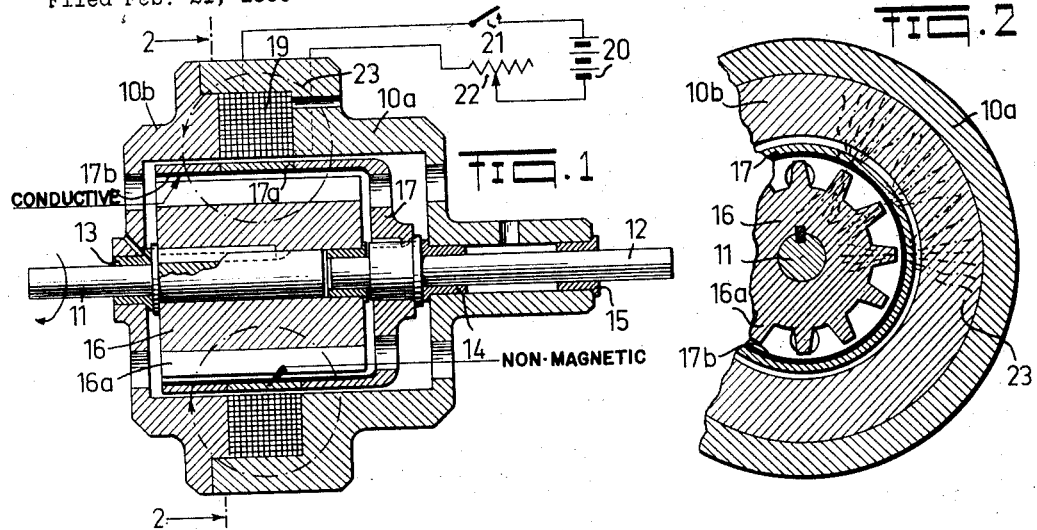
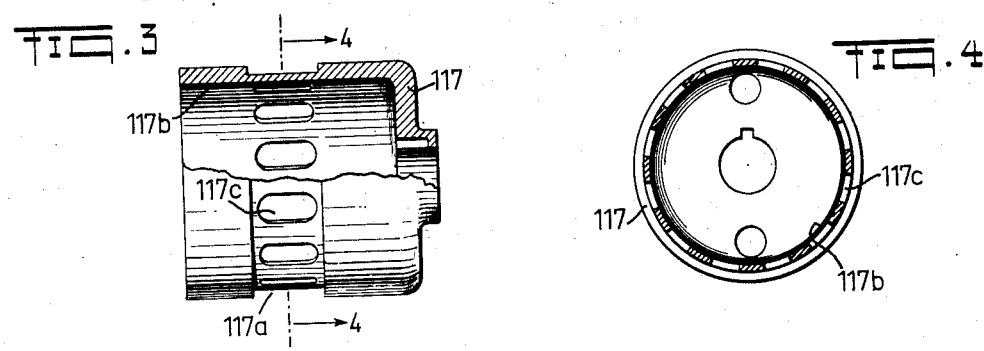
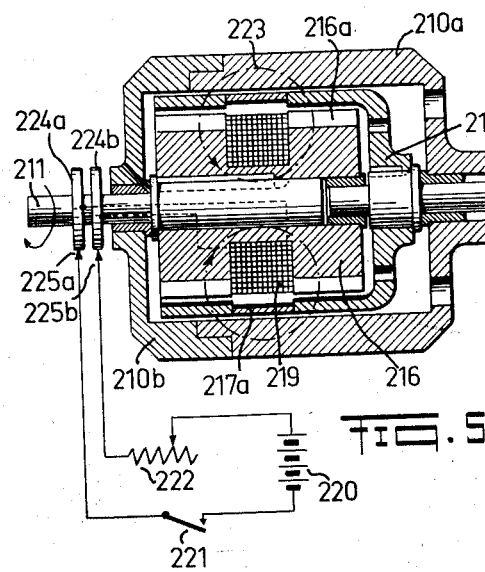
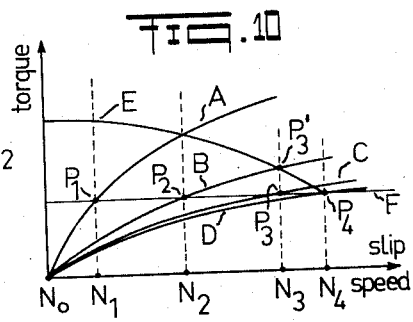
ELIE COHEN
SZYMON ROTH
*INVENTORS*
BY Karl F. Ross
AGENT

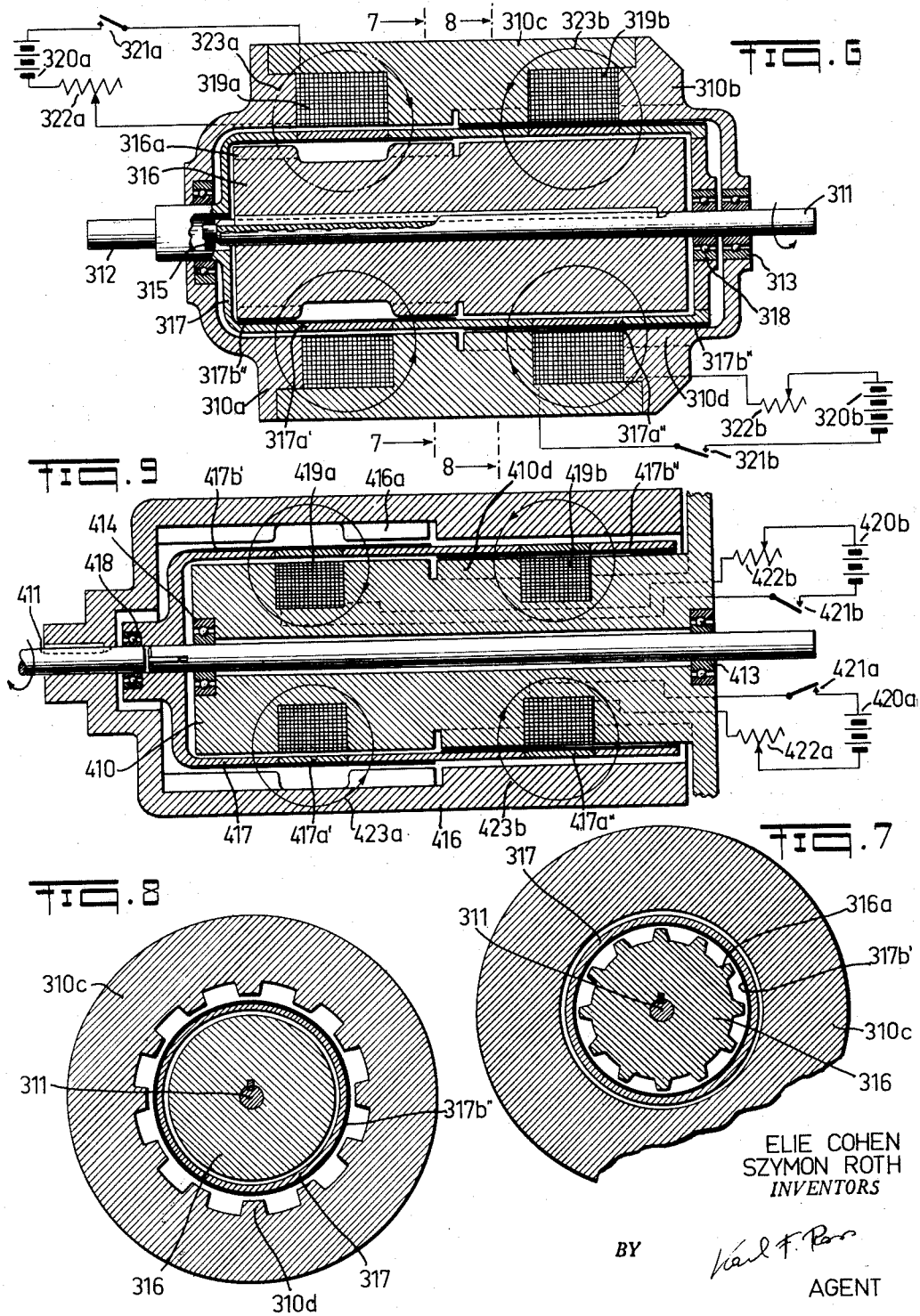

United States Patent Office 2,847,594
Patented Aug. 12, 1958

2,847,594

ELECTROMAGNETIC SLIP COUPLING

Elie Cohen and Szymon Roth, Paris, France, assignors to Leon Naiditch, New York, N. Y.

Application February 21, 1955, Serial No. 489,642

2 Claims. (Cl. 310—96)

Our present invention relates to an electromagnetic slip coupling or clutch of the type in which a driven shaft is adapted to be entrained by a drive shaft by the torque due to the generation of eddy currents in two co-axial coupling members respectively coupled to the two shafts.

Conventional systems of this character comprise a pair of coaxial, at least partly telescoped cylinders of ferromagnetic material representing the two coupling members, these cylinders being threaded by the magnetic flux generated by a direct-current winding carried on one of these cylinders. The coupling member forming part of the driving assembly, i. e. the cylinder coupled to the drive shaft, is provided with longitudinal flutes or crenellations defining ridges or ribs which serve to concentrate the magnetic lines of force in angularly spaced bundles traversing the substantially smooth surface of the opposite coupling member, i. e. of the cylinder coupled to the driven shaft. The driven cylinder thus becomes the seat of eddy currents and, in the manner of the rotor of an induction motor, follows the rotation of the magnetic field and, thereby, of the driving cylinder with a certain lag termed the slip speed; this lag depends on both the strength of the magnetic flux and the drag of the load forming part of or coupled to the driven assembly.

Since, with a given intensity of the magnetic field, the magnitude of the flux will depend on the reluctance of the path it must take, and since in the conventional systems referred to this path is completed through the two coupling members, it is clear that both of these members must be given a substantial wall thickness lest a major part of the lines of force be closed over stray paths serving no useful purpose. This requirement, however, makes the two cylinders bulky and cumbersome and imparts a large moment of inertia to the driven assembly which may be undesirable for many applications, as when the entrained shaft is to operate an indicator or a servo-follower system.

It is, accordingly, an object of this invention to provide an improved clutch of the character described in which the mass of the driven assembly is considerably reduced with respect to that of the known systems mentioned above, whereby a high and favorable ratio of driving torque versus moment of inertia can be obtained with an expenditure of comparatively little electromagnetic energy.

Another object of our invention is to provide an electromagnetic induction system of the general character described having means for varying the speed of a controlled rotating assembly between limits defined by the rotative speeds of two controlling assemblies (one of which may be stationary), whereby a device operating as a combined clutch and brake or as a speed regulator is obtained.

A further object of the present invention is to provide a method of more effectively regulating the speed of a controlled rotating assembly in a device of the type just set forth.

An electromagnetic slipping clutch according to our invention comprises three telescoped or nested cylindrical members of which either the inner or the outer one is crenellated and rigid with the drive shaft, the intermediate member being a relatively thin-walled, substantially smooth cylinder rigid with the driven shaft and consisting at least in part of ferromagnetic material but designed to offer a high reluctance to the magnetic flux in axial direction. A direct-current winding carried by either of the two first-mentioned members generates a flux which, on account of the high longitudinal reluctance of the intermediate member, passes approximately radially through the latter member and through the two air gaps separating it from the other cylinders. The third member, which is not coupled to either the drive shaft or the driven shaft, may be utilized as a support for these shafts and also serves to complete the path for the magnetic flux; this member may, furthermore, also be provided with ribs or crenellations whence emanate the magnetic lines of force of another direct-current winding, energization of the last-mentioned winding thus giving rise to a braking force exerting a retarding torque upon the rotating intermediate cylinder.

It has already been proposed to provide an intermediate cylinder or rotor made entirely of electrically conductive, non-magnetic material. Such a rotor, however, necessitates the existence of a relatively wide gap between the ferromagnetic members on either side thereof, thereby substantially increasing the reluctance of the path to be taken by the useful flux and preventing the realization of a favorable ratio of driving torque versus moment of inertia.

Since the intermediate cylinder is partly magnetic, it is desirable to provide additional means tending to make the direction of the lines of force as nearly perpendicular to its surface as possible. This can be accomplished, according to a further feature of our invention, by providing an air gap adjacent the intermediate cylinder at a location opposite the exciting winding or coil, as by interrupting the crenellations of the driving member at such location.

The high longitudinal magnetic reluctance of the wholly or partly ferromagnetic intermediate cylinder may be brought about or enhanced by the provision, in such member, of a central annular zone of reduced permeability relative to the adjacent annular zones which are to be traversed by the flux. Thus, this central zone (which may be axially co-extensive with the associated exciting winding on one of the other two cylinders) may consist of non-magnetic material; an increased axial reluctance in the central zone referred to may, however, also be achieved by reducing the wall thickness of this zone and/or by forming a series of angularly spaced cutouts therein. Preferably, the intermediate cylinder is provided over at least one of its surfaces with a coating of high electrical conductivity, e. g. of copper.

The above and other objects and features of the invention will become more fully apparent from the following detailed description of certain embodiments, references being had to the accompanying drawing in which:

Fig. 1 shows, in axial section and partly diagrammatically, an electromagnetic clutch embodying the invention;

Fig. 2 is a cross section taken on the line 2—2 of Fig. 1;

Fig. 3 is a side elevation, partly in section, of a modified rotor adapted to be substituted for the one shown in Fig. 1;

Fig. 4 is a cross section taken on the line 4—4 of Fig. 3;

Fig. 5 is a view similar to Fig. 1, showing another embodiment of an electromagnetic clutch according to the invention;

Fig. 6 is a view similar to Figs. 1 and 5, showing a combination clutch and brake according to the invention;

Figs. 7 and 8 are cross sections taken, respectively, on lines 7—7 and 8—8 of Fig. 6;

Fig. 9 is a sectional view, similar to Fig. 6, of a modified clutch and brake embodying the invention; and Fig. 10 is a graph illustrating the operation of the device of Fig. 6 or Fig. 9 when used as a speed regulator.

In Figs. 1 and 2 there has been shown a stationary, substantially cylindrical two-part housing 10a, 10b, a drive shaft 11 and a driven shaft 12 lodged in bearings 13 and 14, 15 in this housing, an inner cylinder 16 keyed onto drive shaft 11, and a cylindrical intermediate member 17 keyed onto driven shaft 12. Driven shaft 12 is also received in a counterbearing 18 within inner cylinder 16. A small air gap separates rotor member 17 from housing 10a, 10b.

A winding 19, received in an annular recess between housing portions 10a and 10b, is connected to a source of direct current 20 in a circuit shown diagrammatically to include a switch 21 and an intensity control device illustrated as a rheostat 22. Members 10a, 10b, 16 and 17 are made of ferromagnetic material, such as steel, with the exception of a central annular zone 17a of non-magnetic metal (e. g. brass) in cylinder 17 which is shown to be axially co-extensive with winding 19 and which may be joined to the adjacent, ferrous portions of this cylinder by, for example, brazing. Inner member 16 is longitudinally fluted or crenellated, thus forming angularly spaced ribs 16a separated by only a small air gap from the inner surface of cylinder 17 which, as indicated in the drawing, carries a layer 17b of good electrical conductivity, e. g. of copper.

When the winding 19 is energized by the closure of switch 21, the resulting magnetic flux 23 is concentrated in the regions of ribs 16a (as illustrated in Fig. 2) and threads the cylindrical members 10a, 10b, 16 and 17 across the intervening air gaps, passing roughly perpendicularly through the thin walls of rotor 17 and its highly conductive layer 17b; only a negligible fraction of the total flux originating (assumedly) in housing portion 10b returns to housing portion 10a directly by way of member 17, owing to the high reluctance of its central zone 17a. Thus, the layer 17b is traversed by almost all of the flux and becomes the seat of eddy currents which magnetically link the rotor 17 with the rotating cylinder 16, thereby entraining the driven shaft 12 at a speed somewhat less than that of drive shaft 11.

In Figs. 3 and 4 we have shown a modified rotor cylinder 117 adapted to be substituted for the member 17 in Figs. 1, 2 and for similar cylinders in subsequent embodiments. Member 117 has a central zone 117a which is integral with the adjoining ferromagnetic zones but is of reduced wall thickness and is also provided with angularly spaced cutouts 117c, both of these measures contributing to an increase in the magnetic reluctance of zone 117a in longitudinal direction of the cylinder. A highly conductive layer is again provided and is shown at 117b.

Fig. 5 illustrates a partial reversal of the arrangement of Figs. 1 and 2 in that the winding 219 is now carried in the recess of inner cylinder 216 which is coupled to drive shaft 211, this shaft carrying a pair of slip rings 224a, 224b connected to winding 219 and energized from circuit 220, 221, 222 over brushes 225a, 225b. It will be noted that the ribs 216a on cylinder 216 are interrupted in the region of winding 219. For the rest, inner member 216, rotor 217 keyed to driven shaft 212, and housing 210a, 210b are substantially identical with their counterparts in Fig. 1 and the operation of the two systems is essentially the same.

The apparatus shown in Figs. 6–8 embodies a further extension of the principles explained in conjunction with Fig. 1. A tripartite housing 310a, 310b, 310c forms a pair of axially spaced recesses for two coils 319a, 319b connected to be energized, respectively, from a source 320a over switch 321a and rheostat 322a and from a source 320b over switch 321b and rheostat 322b. Drive shaft 311 and driven shaft 312 are shown supported by ball bearings to reduce friction, including a bearing 313 supporting shaft 311 in housing portion 310b, a bearing 314 supporting shaft 312 in housing portion 310a, a bearing 315 supporting the top of shaft 311 (which traverses inner cylinder 316) in a recess of shaft 312 shown here integral with intermediate rotor cylinder 317, and a bearing 318 supporting the end of rotor 317 remote from shaft 312 on shaft 311. Rotor 317 is formed with a non-magnetic zone 317a', 317a'' opposite each of coils 319a, 319b.

The left-hand half of drive cylinder 316, located in the region of the flux 323a from winding 319a, is fluted in similar manner to cylinders 16 and 216 in Figs. 1 and 5, being thus formed with angularly spaced rigs 316a; the right-hand half of cylinder 316 is smooth. On the other hand, the right-hand half of housing 310a, 310b 310c, located in the region of the flux 323b from winding 319b, is also fluted and forms angularly spaced ribs 310d, the left-hand half of the housing being smooth. Intermediate cylinder 317 may be conductively coated on the left-hand half of its inner surface, as shown at 317b', and on the right-hand half of its outer surface, as shown at 317b''. The ribs 310d on the housing are broken away in the region of winding 319b in the same manner as are ribs 216a in Fig. 5; at the same time, ribs 317a on rotor 317 are also cut away opposite coil 319a which expedient, though not required for mechanical reasons as in the case of ribs 310d, not only saves weight and material but also serves to direct the flux 323a over a path still more nearly perpendicular to the surface 317b'.

When the coil 319a is energized by the closure of switch 321a, the flux 323a generates eddy currents in the conductive surface 317b' or rotor 317 tending to entrain the latter at a speed approaching that of the crenellated portion 316a of drive cylinder 316. When, conversely, the coil 319b is energized by the closure of switch 321b, the flux 323b generates eddy current in the conductive surface 317b'' of rotor 317 tending to change the latter's speed to one approaching that of crenellated housing portion 310d, i. e. to standstill if the housing itself is stationary. Simultaneous energization of coils 319a and 319b will, therefore, exert opposite torques upon rotor 317 and may be used, with proper setting of the rheostats 322a and 322b, to stabilize the speed of driven shaft 312 at a desired value in a manner more fully described hereinafter.

The arrangement of Fig. 6 may be modified by transferring either or both of the windings 319a, 319b from housing 310a, 310b, 310c to inner cylinder 316 in the manner illustrated in Fig. 5. It may also be inverted with respect to the positions of drive member 316 and stationary support 310a, 310b, 310d relative to rotor cylinder 317, the latter modification having been illustrated in Fig. 9.

In Fig. 9 the member 410 forms a stationary, cylindrical core supporting the accelerating coil 419a and the retarding coil 419b; the energizing circuits for these coils are shown at 420a, 421a, 422a and 420b, 421b, 422b. Driven shaft 412, lodged in bearings 414, 415 in core 410, is keyed to intermediate rotor cylinder 417 which in turn is provided with a bearing 418 supporting drive shaft 411. The latter shaft is keyed to a tubular cylindrical member 416 surrounding the rotor 417.

The left-hand half of outer cylinder 416 carries crenellations or ribs 416a which are interrupted opposite coil 419a and face a conductive layer 417b' on rotor cylinder 417; the right-hand half of inner cylinder or core 410 carries similar crenellations 410d which are broken away at their center to make room for coil 419b and face a conductive layer 417b'' on rotor cylinder 417. The respective fluxes are indicated at 423a, 423b. It will be readily understood that the system of Fig. 9 functions in essentially the same manner as that of Fig. 6.

If the device of Fig. 6 (or that of Fig. 9) is to be operated as a brake, switch 321a is opened to remove the accelerating torque and switch 321b is closed to generate a retarding torque, the rate of deceleration being then dependent on the magnitude of the current drawn by coil 319b as determined by the setting of control device 322b. If the device is to function as a speed regulator, the obvious mode of operation would be to vary the control means 322a until the excitation of coil 319a overcomes the drag of the load at just the speed desired. Reference is made to Fig. 10 in which the absolute speed of driven shaft 312 is given in terms of its slip speed relative to drive shaft 311 whose own speed $N_0$, assumed to be constant, is given by the ordinate axis of the graph. Curves A, B, C and D represent progressively lower exciting currents necessary for rotating shaft 312 at slip speeds $N_1$, $N_2$, $N_3$, $N_4$ corresponding to the abscissae of the respective points of intersection $P_1$, $P_2$, $P_3$, $P_4$ of these curves with horizontal line F representing the dead-load reaction. It will be seen that it is difficult by this mode of operation to establish the lower absolute speeds, e. g. those corresponding to the relatively high slip speeds $N_3$ and $N_4$, with any degree of accuracy since the small slope of curves C and D makes the intersection points $P_3$, $P_4$ indistinct.

If however, according to another feature of our invention, a constant retarding torque as represented by curve E is superimposed upon the dead-load reaction F, through suitable excitation of coil 319b, speed $N_4$ is now defined by the point of intersection between retardation curve E and a member of the family of acceleration curves A, B, C, D etc., here chosen to be the curve D crossing curve E at $P_4$. If the slip speed is to be changed to $N_3$, the excitation is modified to a value here corresponding to curve B which crosses curve E at $P_3'$, the abscissae $N_3$ of this point being the same as that of point $P_3$. It will be noted that point $P_3'$ is considerably more sharply defined than point $P_3$; point $P_4$, at which the superimposed retarding torque becomes zero, represents the maximum slip speed ($N_4$) corresponding to zero absolute speed.

It will thus be seen that we have provided a method of regulating the speed of a driven element, such as shaft 312 or 412, by over-exciting an acceleration coil of a device of the herein disclosed type so as to tend to rotate such element at a higher absolute speed (i. e. at a lower slip speed, such as the speed $N_2$ in Fig. 10), and exciting a retardation coil so as to produce a counteracting torque sufficient to establish the desired speed value (such as the speed $N_3$).

The foregoing analysis is, of course, equally applicable if housing 310a, 310b, 310c (or core 410) is rotated at some speed independent of shafts 311, 312 (or 411, 412) relative to some stationary supporting system (not shown), the assumed case of absolute standstill being only an extreme and specific instance of a driven member electromagnetically controlled, in the manner described, by a pair of independently rotatable sources of magnetic flux.

The invention is not limited to the specific embodiments described and illustrated; it may be readily modified, as by the combination of features shown in different embodiments and/or by other changes obvious to persons skilled in the art, without departing from the spirit and scope of the appended claims.

We claim:
1. An electromagnetic coupling comprising three coaxial, at least partly ferromagnetic, relatively rotatable cylinders including an intermediate cylinder telescoped between two other cylinders, said other cylinders including a first cylinder provided with coil means for producing an electromagnetic flux and a second cylinder adapted to complete a path for said flux across said intermediate cylinder, one of said other cylinders being provided with longitudinal ribs of ferromagnetic material approaching said intermediate cylinder, said intermediate cylinder having at least two solidly ferromagnetic, thin-walled, smooth-surfaced annular portions flanking said coil means and further having at least one annular magnetic portion of increased longitudinal magnetic reluctance intermediate said ferromagnetic portions, the last-mentioned portion being integral with but narrower in cross section than said ferromagnetic portions.

2. An electromagnetic speed regulator comprising a drive shaft, a driven shaft, a first cylindrical member rigid with said drive shaft, a second cylindrical member coaxial with said first member, a third cylindrical member coaxial with and telescoped between said first and second members, said first and second members being at least partly of ferromagnetic material, said third member comprising two sections each consisting of a pair of solidly ferromagnetic, thin-walled, smooth-surfaced annular zones separated by an annular zone of magnetic material of increased axial magnetic reluctance, a first winding on one of said first and second members, a second winding on one of said first and second members, said windings being axially spaced from each other and respectively opposite the zones of increased reluctance of said two sections of said third member, said first member being provided with ferromagnetic ribs opposite the ferromagnetic zones of one of said sections of said third member, said second member being provided with ferromagnetic ribs opposite the ferromagnetic zones of the other of said sections of said third member, said third member being rigid with said driven shaft, a first and a second energizing circuit for applying an exciting current to said first and said second winding respectively, and means in said energizing circuits for varying the magnitude of the current applied to each of said windings.

References Cited in the file of this patent

UNITED STATES PATENTS

| | | |
|---|---|---|
| 643,413 | Kennedy | Feb. 13, 1900 |
| 2,131,035 | Beechlyn | Sept. 27, 1938 |
| 2,223,866 | Beechlyn | Dec. 3, 1940 |
| 2,233,060 | Parvin | Feb. 25, 1941 |
| 2,367,163 | Winther | Jan. 9, 1945 |
| 2,409,557 | Gilfillan | Oct. 15, 1946 |
| 2,428,104 | Winther | Sept. 30, 1947 |
| 2,490,789 | Ellis | Dec. 13, 1949 |
| 2,565,494 | Gilfillan | Aug. 28, 1951 |
| 2,630,467 | Winther | Mar. 3, 1953 |

FOREIGN PATENTS

| | | |
|---|---|---|
| 614,091 | Great Britain | Dec. 9, 1948 |